(12) United States Patent
Coles et al.

(10) Patent No.: US 7,234,141 B2
(45) Date of Patent: Jun. 19, 2007

(54) PROCESSING DATA

(75) Inventors: Alistair Neil Coles, Bath (GB); Aled Justin Edwards, Wotton-under-Edge (GB); Eric Henri Ulysse Deliot, Bristol (GB)

(73) Assignee: Hewlett-Packard Development Company, L.P., Houston, TX (US)

( * ) Notice: Subject to any disclaimer, the term of this patent is extended or adjusted under 35 U.S.C. 154(b) by 747 days.

(21) Appl. No.: 10/281,085

(22) Filed: Oct. 24, 2002

(65) Prior Publication Data

US 2003/0115381 A1 Jun. 19, 2003

(30) Foreign Application Priority Data

Oct. 26, 2001 (GB) .................. 0125743.5

(51) Int. Cl.
*G06F 9/46* (2006.01)
*G06F 17/00* (2006.01)

(52) U.S. Cl. ........................ 718/101; 700/94

(58) Field of Classification Search ................ 718/101; 700/94

See application file for complete search history.

(56) References Cited

U.S. PATENT DOCUMENTS 5,128,760 A * 7/1992 Chauvel ..................... 348/452
6,961,632 B2 * 11/2005 Hashimoto et al. .......... 700/94

FOREIGN PATENT DOCUMENTS

EP 0 187 518 A2 7/1986
EP 0 230 383 A2 7/1987

* cited by examiner

*Primary Examiner*—Meng-Al T. An
*Assistant Examiner*—Camquy Truong

(57) ABSTRACT

Many modern microprocessors support parallel processing operations, such as single instruction multiple data (SIMD) operations. The present invention presents a number of ways in which maximum advantage can be taken of these operations to provide an efficient way of processing multiple data channels.

15 Claims, 3 Drawing Sheets

FIGURE 3

PROCESSING DATA

The present invention relates to the field of processing data and, particularly, to ways of improving the efficiency of processing data channels in parallel.

Many modern microprocessors support parallel processing operations, such as single instruction multiple data (SIMD) operations. SIMD operations and are available on, for example, the Intel Pentium 4, or the Hewlett-Packard PA-RISC/MAX processors. Processing which uses SIMD operations can exhibit impressive performance improvements over non-SIMD operations, particularly for certain intensive media processing operations.

When processing multiple data channels or streams it is desirable to take advantage of SIMD operations to improve processing performance, however performance problems can arise when processing large numbers of data streams. Additionally, the extent to which SIMD operations can be used may also depend on the nature of the data in the data streams.

Accordingly, one aim of the present invention is to improve the efficiency of processing data streams when using SIMD or other parallel processing operations.

According to a first aspect of the present invention, there is provided a method of performing a plurality of processing functions on a plurality of input channels, wherein each processing function has a preference for processing a number of the input channels, the method comprising: determining a batch size of input channels by dividing the plurality of input channels into a plurality of batches, wherein the size of each batch is based on the preferences of each processing function; processing the input channels in batches of the determined batch size or multiples thereof by performing each processing function on every input channel in the batch.

According to a second aspect of the present invention, there is provided a method of performing processing functions on input channels, wherein each processing function has a preference for processing a number of the input channels, and further wherein the processing functions are executed by a microprocessor having a cache, comprising: determining the data requirements of processing a single input channel; determining a batch size by dividing the plurality of input channels into batches, wherein the size of each batch is based on the preferences of each processing function; determining a preferred batch size based on the size of the cache, the determined data requirements, and the determined batch size, wherein the preferred batch size is determined to prevent overflow of the cache during the processing of each batch; and processing the input channels in batches of the preferred batch size by performing each processing function on each input channel in the batch.

According to a third aspect of the present invention, there is provided a software tool for use in a data processing system for processing input channels, the system comprising processing functions each having a preference for processing a number of the input channels, comprising: means for determining a batch size of input channels by dividing the input channels into batches wherein the size of each batch is based on the preferences of each processing function; means for arranging the processing functions to enable processing of the input channels in batches of the determined batch size, wherein each processing function is performed the requisite number of times to ensure that each processing function processes the same number of input channels.

An example embodying the invention will now be described, by way of non-limiting example, with reference to the accompanying drawings, in which:

FIG. 1 a block diagram showing a representation of part of a telecommunication voice processing system;

FIG. 3 is a diagram showing the matrix of FIG. 2 in greater detail; and

Figure 1:
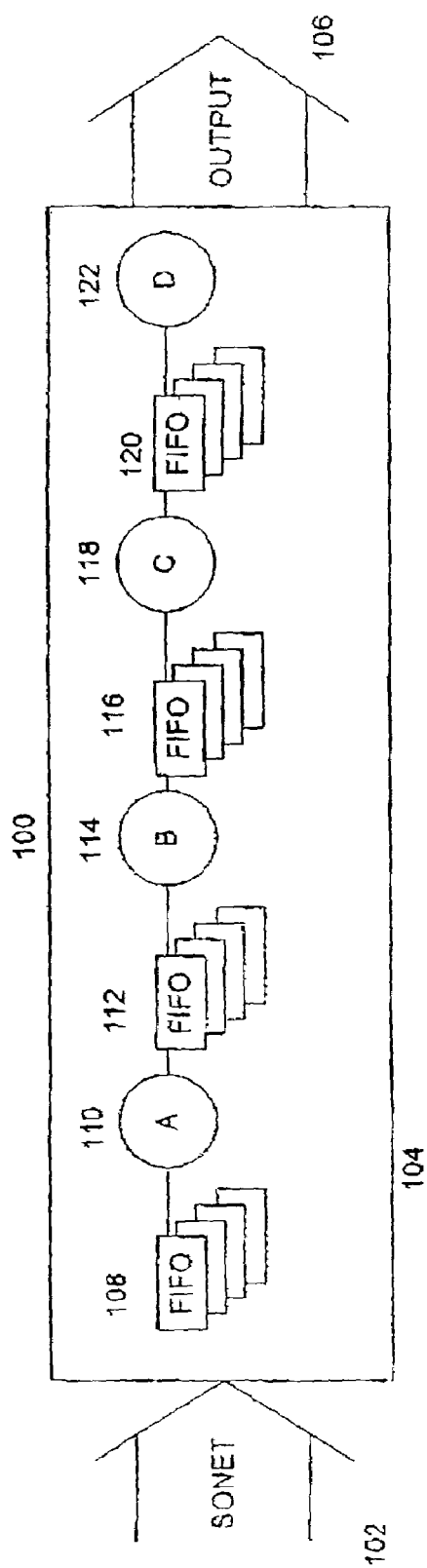

FIG. 1 is a block diagram showing a representation of part of a telecommunication voice processing system 104. The voice processing system preferably runs on a hardware platform which supports SIMD or parallel processing operations, for example a Hewlett Packard PA-RISC platform. An input 102, for example, an optical SONET input, delivers voice channels to the voice processing system 104. In a typical telecommunications system, up to 2000 voice channels may be supplied at the input 102 for processing by the voice processing system 104. The voice processing system 104 processes the input voice channels and produces an output 106 of processed voice channels.

Within the voice processing system 104, a number of processing functions 110, 114, 118 and 122 are performed consecutively on each of the input data channels The processing functions 110, 114, 118, and 122 are written in software for execution on the specific hardware platform. A series of buffers 108, 112, 116 and 120 precede each processing function.

Each of the processing functions 110, 114, 118 and 122 typically performs a different operation, for example the processing function 110 may perform a dual tone multi-frequency (DTMF) detection operation, the processing function 114 may perform an echo cancellation operation, and so on.

The processing of each of the input channels is performed on discrete samples from each input channel. The size of the samples processed at one time for each input channel may vary depending on the type of processing system. In the telecommunications voice processing system of FIG. 1, 8 ms worth of data is processed at a time from each input channel. This equates to 64 bytes of data. In other systems a lesser or greater sample size may be used as required.

The aim of a voice processing system is to process all the current data samples from all of the incoming channels with each of the processing functions, before the next data sample arrives at the input.

Figure 2:
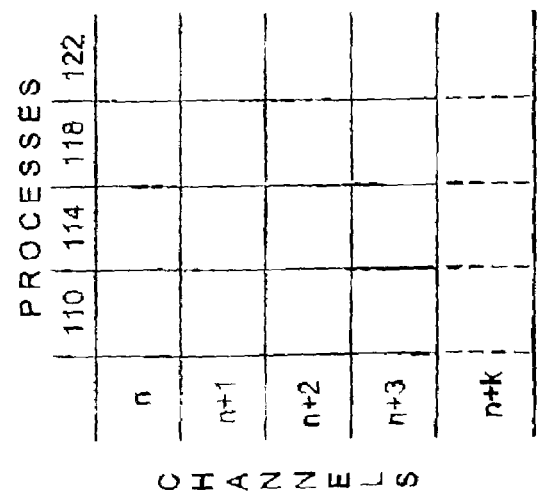
FIG. 2 is a diagram showing a matrix representing the input voice channels and processing functions of FIG. 1.

FIG. 2 is a diagram showing a matrix representing the input voice channels and processing functions of FIG. 1. The columns of the matrix represent each of the processing functions 110, 114, 118 and 122, as shown. Each row of the matrix represents a different input channel, from channel n to channel n+k.

One approach to processing in such a voice processing system is to process each input channel separately. For example, channel n is first processed by the processing function 110, then the output of this processing step is processed by the processing function 114, and so on. When the current data sample for channel n has been fully processed the processing steps are repeated for channel n+1, until the current data samples from each of the input channels have been processed.

One problem with this approach is that, if a SIMD capable processor is used, it is not always possible to take advantage of the SIMD operations due to data dependencies which may exist between data samples in each channel. The presence of such inter-sample data dependencies means that the result of processing a first data sample is used in the processing of subsequent adjacent data samples. This removes the possibility of being able to process multiple adjacent data samples from the same input channel in parallel.

Another disadvantage with this approach is that, since each of the processing functions are performed on only a small amount of data at a time, this does not make efficient use of the instruction cache of the microprocessor, since the processor is frequently having to load new instructions into the instruction cache.

A second approach is to process the data samples from all of the input channels n to n+k simultaneously with the processing function 110, then to process the results of the first processing function with the processing function 114, and so on. By performing the processing in this way the data dependencies are removed, since data samples from different input channels are independent from one another. This approach enables advantage to be taken of the SIMD operations, and allows the processing of different data samples to be performed in parallel. An additional advantage which arises from using this approach is that the instruction cache of the microprocessor may be more fully utilized, since the same operating instructions are performed repeatedly, and are therefore cached more effectively.

Although the second approach outlined above is generally preferable over the first approach, it is desirable to further increase processing efficiency.

In a first embodiment, the processing functions 110, 114, 118 and 122 are designed and written to take advantage of the available SIMD operations on the hardware platform. Since each processing function performs a different, and often complex, processing task the designer of each processing function defines a preferred processing function batch size for each of the processing functions 110, 114, 118 and 122. Those skilled in the art will appreciate that specific assembler language operations are used which enable advantage to be taken of available SIMD operations. Since the assembler language operations differ between microprocessors, specific detail will not be entered into herein.

As previously described, SIMD operations enable a microprocessor to perform a processing operation on multiple items of data simultaneously. This is achieved, for example, by loading data into a specific register of the microprocessor. For example, if the register is a 64 bit register, and a single byte-sized sample is to be processed at a time from each of the input channels, the preferred processing function batch size would be eight, since single bytes from eight different input channels would completely fill the register. Alternatively, if a processing function processes two bytes of data from each input channel at a time, the preferred processing function batch size would be four. The batch size therefore defines the number of input channels which should, as defined by the function designer, preferably be processed at one time by a processing function in order to maximize the use of SIMD operations. Each processing function can make its preferred batch size available to the system, for example through a predefined API call, or through a separate descriptor file.

In the voice processing system 104 of FIG. 1, a number of different processing functions 110, 114, 118 and 122 are provided, and each processing function may have a different preferred batch size.

From each of the preferred processing function batch sizes, a system batch size is determined, taking into account the preferred processing function batch size of each of the processing functions 110, 114, 118 and 122. The system batch size may be determined by taking the lowest common multiple of all the preferred processing function batch sizes of all of the processing functions 110, 114, 118 and 122. For example, if the preferred processing function batch sizes of processing functions 110, 114, 118 and 122 are respectively 4, 1, 4, and 8, the lowest common multiple of the preferred processing function batch sizes is eight.

Once the system batch size has been determined, each processing function in the system uses the system batch size for processing. For example, the processing function 110, which has a preferred batch size of four, will be executed twice so that eight input channels will be processed instead of just four. Consequently, processing function 118, having a preferred batch size of one, will be executed eight times, instead of just once. In this way, each of the processing functions in the voice processing system 104 will each process the same number of input channels.

Figure 3:
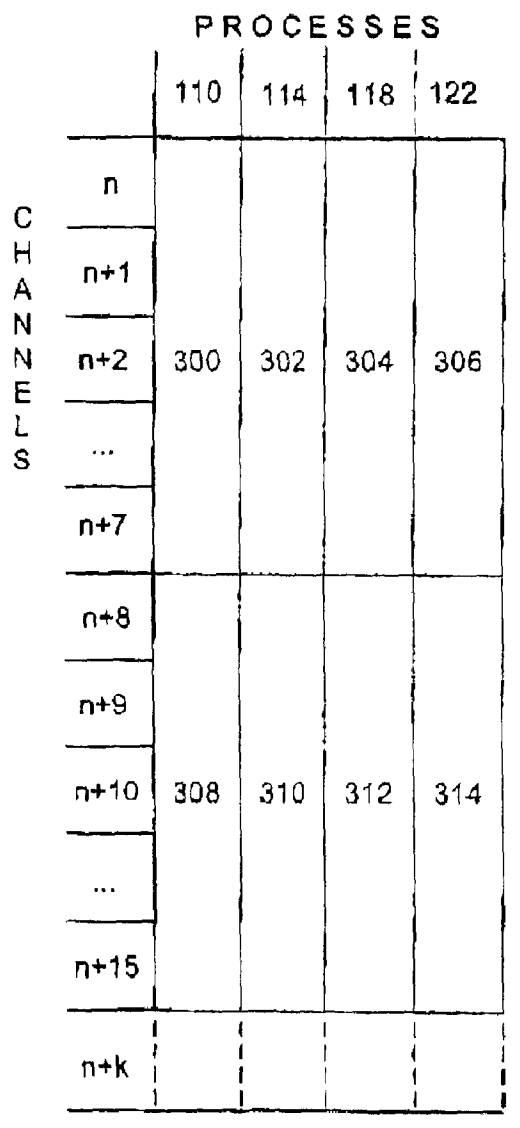

Once the system batch size has been determined the processing of the input channels can be carried out as is shown in FIG. 3.

FIG. 3 is a diagram showing the matrix of FIG. 2 in greater detail. For a preferred batch size of eight, a data sample from each of the input channels n to n+7 is processed by processing function 110 (batch 300). Next, processing function 114 is processed for input channels n to n+7 (batch 302), and so on. Once the processing function 122 has been processed for input channels n to n+7 (batch 306), the next batch of channels may be processed. Subsequently, the processing function 110 is performed for input channels n+8 to n+15 (batch 308), and so on. This batch processing is continued until all the input channels n to n+k have been processed for their respective current data samples. Then, the next data sample is taken from each of the input channels, and the processing continues as described.

In the above example, the system batch size is determined as being eight. This results in the processing function 110 processing twice as many input channels as its individual preferred batch size. On the face of it, it would appear that by increasing the number of input channels processed at a time, the greater the benefits obtained by the SIMD or parallel operations of the hardware platform. Whilst this is true to some extent, as might be expected it is not possible to process more and more input channels simultaneously and to expect greater and greater performance increases. One of the limiting factors is she cache size of the microprocessor which is used for executing the processing functions.

Figure 4:
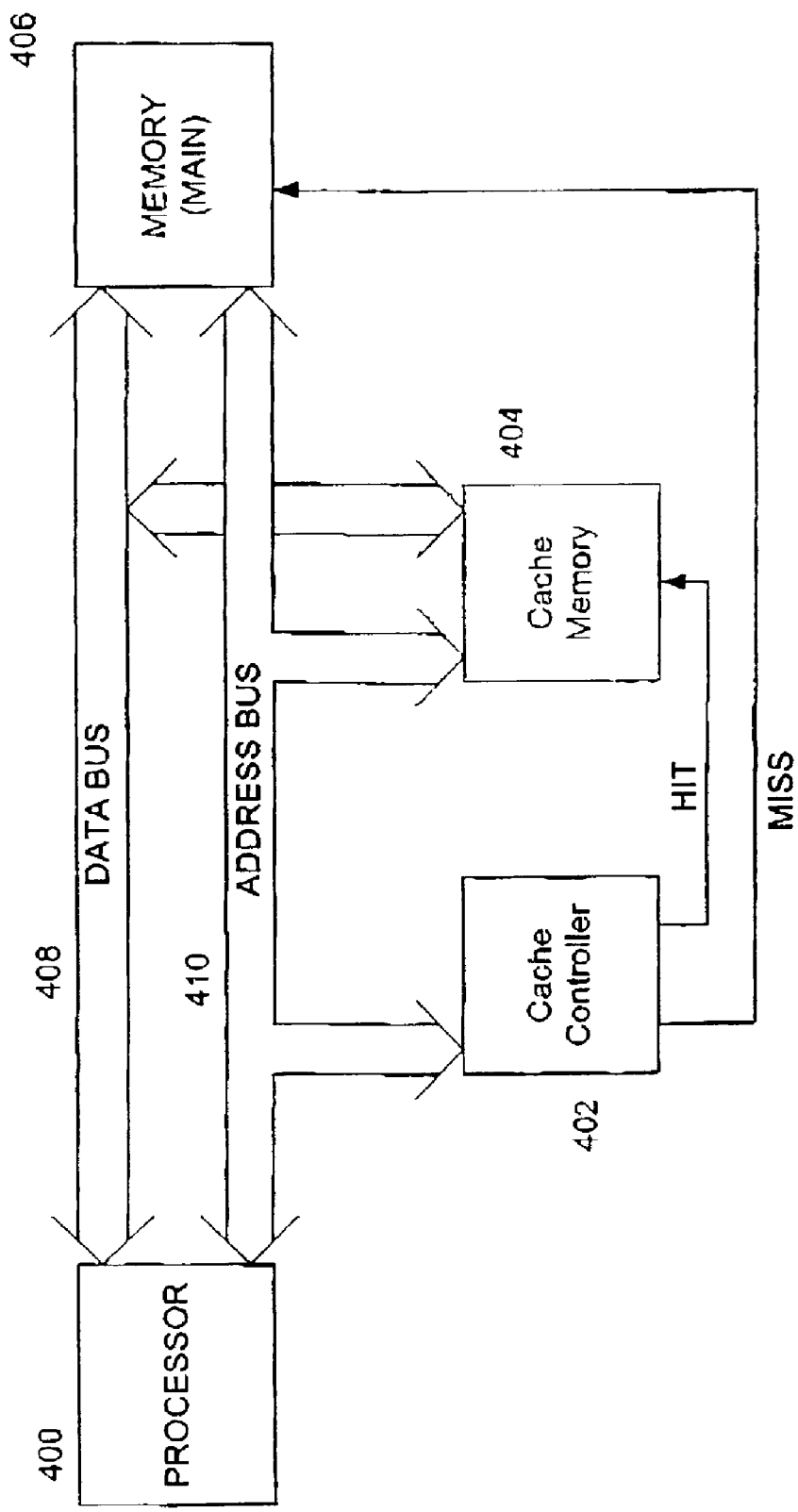
FIG. 4 is a block diagram showing an overview of a typical microprocessor and cache arrangement.

FIG. 4 is a block diagram showing an overview of a typical microprocessor and cache arrangement. A microprocessor 400 is connected via a data bus 408 and an address bus 410 to a cache memory 404 and a main memory 406. The microprocessor is additionally connected via the address bus 408 only to a cache controller 402. The cache controller operates to establish whether data currently being accessed by the CPU resides in the cache memory 404 or whether it needs to be obtained from the main memory 406. Since the cache memory generally operates at a much higher speed than the main memory it is beneficial to ensure that as many data accesses as possible are made directly from the cache memory 404. Each time data being accessed has to be obtained from the main memory 406, additional processor cycles are required to obtain the data. In addition to this, the microprocessor may also have to wait whilst the slower main memory 406 actually supplies the required data.

Referring back to FIG. 2, consider the case where all of the input channels n to n+k are processed at once, first by processing function 110, then by processing function 114, and so on. The processed data for each input channel is written into the data cache of the microprocessor used to execute the processing functions. As more input channels are processed, so the data cache fills up. Since the data cache is of a limited size, when the data cache is full, existing data in the data cache is overwritten. If the data cache becomes full, when the next processing step, processing function 114, is executed, the previously stored data processed by the processing function 110 is no longer available in the data cache. Subsequent requests to access such data will therefore have to be obtained from the slower main memory 406. With the large amounts of data processed by such a voice processing system, the performance lost by having to retrieve data from slow main memory can be significant.

In a further embodiment, it is determined whether the system batch size will result in an overflow of the data cache and it is further investigated as to whether the system batch size can be increased so as to further maximize the use of the data cache.

In order to determine whether the data cache will overflow, first the amount of data generated and required for a single channel during execution of all of the processing functions 110, 114, 118 and 122 must be determined. This can include, for example, the size of any inputs, outputs, and data structures. For the sake of explanation, assume that the processing of each channel will require 5 k bytes of data cache. If the data cache is 256 k bytes in size, this means that 51 channels can be processed at one time without overflowing the data cache. The preferred system batch size is therefore determined as the highest multiple of the system batch size, i.e. 8, which is less than or equal to maximum number of channels which can be processed without causing the cache to overflow, in this case 48. Therefore, it is determined that 48 input channels can be processed at once without causing the data cache to overflow. As described above, each of the processing functions can be executed multiple times, or in multiple instances to ensure that the correct number of channels are processed by all of the processing functions.

To help ensure that the cache will not overflow it is preferable to store the inputs, outputs and data structures, as described above, for each consecutive channel contiguously in memory. In cache systems which use the low order bits of the memory address as the cache index, this technique ensures that the data will not overflow in the cache.

Once the preferred system batch size has been determined processing the input channels can proceed in batches of the preferred system batch size, as described above. Once the current data sample for each of the input channels has been processed, the next data sample from each of the input channels can be processed in the same manner.

This advantageously increases the performance of the microprocessor since all the data requests can be supplied by the cache memory. Furthermore, full advantage can be made of the SIMD operations. Additionally, performance gains are obtained by improved instruction caching as a result of processing of a single processing function multiple times.

The techniques described in the above example may be implemented as a software tool for configuring a voice processing system. As shown in FIG. 1, a number of processing functions 110, 114, 118 and 122 are shown. In different voice processing systems a different number and/or different arrangement of processing functions may be required. For example, it may be required to additionally perform a voice decompression/compression function. Typically, each processing function is provided, for example, as a library function, on the hardware platform. When the voice processing system is initialized, the number, type and arrangement of the processing functions is defined using the software tool. Once the software tool knows the number and type of the processing functions to be implemented in the voice processing system, the software tool can determine the system batch size or preferred system batch size in accordance with the above description.

Once the appropriate batch size has been determined, the software tool can determine, based on the preferred batch size of each processing function, how many times, or in how many instances, each processing function should be run in order to ensure that all processing functions process the same number of input channels. For example, if the system batch size is determined as being 8, and a processing function has a preferred batch size of 4, the software tool will ensure that the processing function is executed twice so it thereby processes eight input channels.

It will be appreciated by those skilled in the art that the inventive concepts described above are not limited to application to a voice processing system. Indeed, the inventive concepts described herein can equally be applied to any other data processing system where it is desirable to maximize processor efficiency, especially for maximizing certain parallel processing operations such as SIMD or equivalent operations. Other such data processing systems could include, for example, a system for processing digital video broadcast (DVB) transport streams. A DVB transport stream contains a number of multiplexed DVB channels in a single transport stream Each of the DVB channels is separated by a multiplexer and each channel may be decoded, for example, using a system in accordance with the above description.

The invention claimed is:

1. A method of performing a plurality of processing functions on a plurality of input channels, wherein each processing function has a preference for processing a number of the input channels and wherein the processing functions are executed on a microprocessor having a cache, the method comprising:
   determining a system batch size of input channels by dividing the plurality of input channels into a plurality of batches, wherein the size of each batch is based on the preference of each processing function;
   processing the input channels in batches of the determined system batch size or multiples thereof by performing each processing function on every input channel in the batch;
   determining data requirements of processing a single channel; and
   determining a preferred batch size based on the size of the cache, the determined data requirements, and the preferences, wherein the preferred batch size is such so as to prevent overflow of the cache during the processing of each batch and wherein the preferred batch size is a integer multiple of the system batch size;
   and further wherein the step of processing the input channels is adapted for processing the input channels in batches of the preferred batch size.

2. The method of claim 1, wherein the step of determining the preferred batch size is based on finding the lowest common multiple of the preferences of the processing functions.

3. The method of claim 1, wherein the step of processing the input channels further comprises, where a given processing function of said plurality of processing functions has a preference which is lower than the determined batch size, performing the given processing function multiple times so as to process every input channel in the batch.

4. The method of claim 1, wherein the method further comprises storing data generated from processing consecutive input channels contiguously in said cache memory.

5. The method of claim 1, adapted for use with a single instruction multiple data (SIMD) capable microprocessor.

6. A voice processing system operating in accordance with the method of claim 1.

7. A method of performing processing functions on input channels, wherein each processing function has a preference for processing a number of the input channels, and further wherein the processing functions are executed by a microprocessor having a cache, comprising:
  determining data requirements of processing a single input channel;
  determining a system batch size by dividing the plurality of input channels into batches, wherein the size of each batch is based on the preferences of each processing function;
  determining a preferred batch size based on the size of the cache, the determined data requirements, and the determined system batch size, wherein the preferred batch size is determined to prevent overflow of the cache during the processing of each batch and comprises an integer multiple of the system batch size; and
  processing the input channels in batches of the preferred batch size by performing each processing function on each input channel in the batch.

8. A data processing system for performing a plurality of processing functions on a plurality of input channels, wherein each processing function has a preference for processing a number of input channels, comprising:
  calculating means for determining a batch size of input channels by dividing the plurality of input channels into a plurality of batches, wherein the batch size is based on the preferences of each processing function;
  a processor for processing the input channels in batches of the determined batch size or multiples thereof by performing each processing function on every input channel in the batch,
  wherein the processor has a cache memory, and wherein the calculating means is adapted for determining data requirements of processing a single channel and for determining a preferred batch size based on the size of the cache, the determined data requirements and the preferences, the preferred batch size being determined so as to prevent overflow of the cache during processing of each batch; and
  wherein the processor is adapted for processing the input channels in batches of the preferred batch size.

9. A data processing system according to claim 8, wherein, where a processing function has a preference which is lower than the preferred batch size, the processor is adapted to perform that processing function multiple times to thereby process every input channel in the batch.

10. A data processing system according to claim 8, wherein the processor is a single instruction multiple data (SIMD) capable processor.

11. A data processing system for performing a plurality of processing functions on a plurality of input channels, wherein each processing function has a preference for processing a number of input channels, comprising:
  calculating means for determining a batch size of input channels by dividing the plurality of input channels into a plurality of batches, wherein the batch size is based on the preferences of each processing function;
  a processor for processing the input channels in batches of the determined batch size or multiples thereof by performing each processing function on every input channel in the batch; and
  wherein the calculating means determines a preferred batch size by determining the lowest common multiple of the preferences of each processing function.

12. A data processing system according to claim 11, wherein, where a processing function has a preference which is lower than the determined batch size, the processor is adapted to perform that processing function multiple times to thereby process every input channel in the batch.

13. A data processing system according to claim 11, further including a memory, and wherein the processor is adapted for storing data generated from the processing of consecutive input channels contiguously in memory.

14. A data processing system according to claim 11, wherein the processor is a single instruction multiple data (SIMD) capable processor.

15. A method of performing a plurality of processing functions on a plurality of input channels, the processing being performed on a microprocessor having a cache, and wherein each processing function has a preference for processing a number of the input channels, the method comprising:
  determining data requirements of processing a single channel;
  determining a preferred batch size based on the size of the cache, the determined data requirements and preferences of each function, the preferred batch size being determined so as prevent overflow of the cache during the processing of each batch; and
  processing the input channels in batches of the preferred batch size or multiples thereof by performing each processing function on every input channel in the batch.

* * * * *